(12) United States Patent
Cirne et al.

(10) Patent No.: US 7,234,080 B2
(45) Date of Patent: Jun. 19, 2007

(54) LOCATING POTENTIAL SOURCES OF MEMORY LEAKS

(75) Inventors: Lewis K. Cirne, Redwood City, CA (US); John B. Bley, San Mateo, CA (US); Daryl L. Puryear, San Mateo, CA (US); David Latham, Berkeley, CA (US)

(73) Assignee: Computer Associates Think, Inc., Islandia, NY (US)

( * ) Notice: Subject to any disclaimer, the term of this patent is extended or adjusted under 35 U.S.C. 154(b) by 378 days.

(21) Appl. No.: 10/318,326

(22) Filed: Dec. 12, 2002

(65) Prior Publication Data

US 2004/0078540 A1    Apr. 22, 2004

Related U.S. Application Data

(60) Provisional application No. 60/419,689, filed on Oct. 18, 2002.

(51) Int. Cl.
*G06F 11/34* (2006.01)
*G06F 11/36* (2006.01)

(52) U.S. Cl. ..................... 714/38; 717/124
(58) Field of Classification Search .............. 714/37, 714/38; 717/124, 130
See application file for complete search history.

(56) References Cited

U.S. PATENT DOCUMENTS

| | | | |
|---|---|---|---|
| 5,655,081 A | 8/1997 | Bonnell et al. | |
| 5,898,873 A | 4/1999 | Lehr | |
| 5,978,594 A | 11/1999 | Bonnell et al. | |
| 6,167,535 A * | 12/2000 | Foote et al. | 714/38 |
| 6,182,022 B1 * | 1/2001 | Mayle et al. | 702/182 |
| 6,182,249 B1 * | 1/2001 | Wookey et al. | 714/47 |
| 6,282,702 B1 * | 8/2001 | Ungar | 717/148 |
| 6,332,212 B1 | 12/2001 | Organ et al. | |
| 6,597,907 B1 * | 7/2003 | Pruitt et al. | 455/423 |
| 6,810,495 B2 * | 10/2004 | Castelli et al. | 714/47 |
| 6,817,011 B1 * | 11/2004 | Reynolds | 717/130 |
| 6,832,236 B1 * | 12/2004 | Hamilton et al. | 718/100 |
| 6,836,800 B1 * | 12/2004 | Sweet et al. | 709/224 |
| 6,892,378 B2 * | 5/2005 | Curtis et al. | 717/127 |
| 2003/0149960 A1 * | 8/2003 | Inamdar | 717/118 |

OTHER PUBLICATIONS

Microsoft Windows 2000 Server Operations Guide Published by Microsoft Press Jan. 19, 2000 ISDN 1-57231-805-8.*

* cited by examiner

*Primary Examiner*—Scott Baderman
*Assistant Examiner*—Joseph Schell
(74) *Attorney, Agent, or Firm*—Vierra Magen Marcus & DeNiro LLP (57) ABSTRACT

Potential sources of memory leaks are identified by tracking the size of groups of stored items and determining based on the growth pattern of the groups whether the groups of stored items are potential sources of memory leaks. An example of a group of stored items is an instance of a Java collection. If the growth pattern of a particular group of stored items indicates that it may be the source of a memory leak, that group is reported to a user and will continue to be tracked.

61 Claims, 4 Drawing Sheets

LOCATING POTENTIAL SOURCES OF MEMORY LEAKS

This application claims the benefit of U.S. Provisional Application No. 60/419,689, "Web Application Monitoring," filed on Oct. 18, 2002, which is incorporated herein by reference in its entirety.

BACKGROUND OF THE INVENTION

1. Field of the Invention

The present invention is directed to technology for finding the source of memory leaks.

2. Description of the Related Art

Memory leaks are allocated memory that are no longer in use. They should have been freed, but were not. Memory leaks slow program execution and can cause programs to run out of memory. Many times the effects of memory leaks can cause a program to crash. Memory leaks are very difficult to detect because memory leaks rarely produce directly noticeable effects, but instead cumulatively degrade and/or affect overall performance. That is, a memory leak typically does not have a direct symptom. The cumulative effects of memory leaks is that memory is lost which increases the size of the working memory being used. In the worst case, a program can consume the entire virtual memory of the host system.

The indirect symptom of a memory leak is that a process's address space grows during activity when one would have expected it to remain constant. Thus, a prior test methodology for finding memory leaks is to repeat an action many times and to conclude that there are no leaks if the address space growth levels out. However, there are two problems with this methodology. The first problem is that it does not rule out that there simply was enough unallocated heap memory in the existing address space to accommodate the leaks. In other words, the address space does not grow, but there does exist a leak. The assumption that testers have is that if the leak was significant enough to care about, it would have consumed all of the unallocated heap memory within the chosen number of repetitions and forced an expansion of the process's address space.

The second problem with this repetition methodology is that it is quite time-consuming to build test sweeps that repetitively exercise every feature and automatically watch for improper address space growth. In fact, it is generally so time-consuming that it is rarely done at all. Suppose, however, that a developer sufficiently builds a leak detecting sweep and finds that the address space grows unacceptably due to one or more leaks. The developer still must spend a considerable amount of time to track down the problems. A developer could shrink the test sweep bit by bit until the address space growth is no longer observed, or modify the allocation process and free process to record their arguments and perform an analysis of what was allocated but not freed. The first technique is fairly brute force and can take many iterations to track down a single leak. The second technique is powerful in practice, but has problems. In any given repetition loop there may be allocated chunks that are allocated but legitimately not freed until the next iteration. Thus, just because a chunk was allocated but not freed during an iteration does not mean the chunk represents a leak. It may represent a carry-over from a previous iteration. An improved technique is to record the allocation and free calls for an entire program run and look for chunks that are allocated but not freed. The problem with this is the existence of permanently allocated data, such as a symbol table, that is designed to be to be reclaimed only when the process terminates. Such permanently allocated data may show up as a leak.

Memory leaks are so hard to detect and track down that they are often simply tolerated. In short-running programs, this is not serious. However, in long-running programs it can be a major problem. For example, consider a web application that is available to users twenty-four hours a day, seven days a week. In that case, a memory leak could grow and accumulate over time, such that the program degrades in performance so as to be come unusable. An organization that relies on commerce or on functions via the Internet may not be able to live with such degradation of performance or crashing of their Internet applications.

A previous attempt to solve the memory leak problems with applications written in the C++ programming language include malloc-debug packages. These packages implemented the malloc interface and also provided several levels of additional inter-checking and memory marking. Unfortunately, malloc-debug packages do not detect errors at the point they occur. They only detect errors at the next malloc_verify call. Since malloc_verify has to scan the entire heap, it is expensive to call frequently.

Another previous tool for working with memory leaks used a mark and sweep algorithm. In the mark phase, the tool recursively followed potential pointers from data and stack segments into the heap and marked all block references in the standard conservative and pessimistic manner. In the sweep phase, the tool stepped through the heap and reported allocated blocks that no longer seem to be referenced by the program. The tool also modified malloc to label each allocated block with the return addresses of the functions then on the call stack. These addresses, when translated into function names and line numbers via the symbol table identified the code path that allocated the leaked memory and often made it somewhat easy for the programmer to eliminate the error.

While some of the above-described tools were somewhat successful for use with applications created using the C and C++ programming languages, they were not sufficient for applications written in Java. Java differs from C and C++ in ways that have made prior memory leak solutions not available to Java applications. For example, in C and C++, the program is responsible for allocating and freeing memory. In addition, it is possible to monitor each allocation. On the other hand, with Java the Java Virtual Machine ("JVM") is responsible for freeing memory. Additionally, there are millions of objects that can be used in an application. Thus, tracking allocation may not be practical.

When Java first became popular, many programmers thought that they no longer had to worry about memory leaks because with Java the programmer simply creates objects and the JVM takes care of removing them when they are no longer needed. The task of removing unused objects is known as "garbage collection." The garbage collector finds objects that are no longer needed by an application and removes them when they can no longer be accessed or referenced. The garbage collector starts at the root nodes, classes that persist throughout the life of a Java application, and sweeps through all the nodes. As it traverses the nodes, it keeps track of which objects are actively being referenced. Any objects that are no longer being referenced are then eligible to be garbage collected. The memory resources used by these objects can be returned to the JVM when the objects are deleted. Thus, Java does not necessarily require the programmer to be responsible for memory management and cleanup because it automatically garbage collects unused objects. However, an object is only counted as being unused when it is no longer referenced. Thus, if a set of objects are created for use for a short period of time, and the reference to the object is not removed, then a leak may be created.

One attempt to debug memory leaks in Java applications tracks every object allocated and keeps a record of every object created. After the application is run, the information is analyzed by a human. Tracking every object requires a lot of CPU time, which prevents the application from running in production when the memory leak debug tool is operating. Because the application has to be run in a non-production environment, it may be possible that the leak is not reproduced in the non-production environment (e.g. a debugging or testing environment). Also, there is a heavy burden on the human developer to read through all of the information.

Thus, there is a need for an improved means for debugging memory leaks in Java applications.

SUMMARY OF THE INVENTION

The present invention, roughly described, pertains to technology for identifying potential sources of memory leaks by tracking growth patterns of groups of stored items. One example of a group of stored items is an instance of a Java collection. If the growth pattern of a collection indicates that it may be the source of a memory leak, that collection is reported to a user and will continue to be tracked.

In one embodiment, the present invention includes looking for collections that appear to be growing in size. These collections are flagged as potential sources of leaks. The system then reports information for these collections as metric data as well as to a log file. If a flagged collection no longer appears to be leaking, that change in status will be reported; however, the system will continue tracking and reporting data for that collection.

An additional feature is a time-out period. Before the time-out period expires, the system will track all newly allocated collections and check all tracked collections. After the time-out period expires, the system stops tracking newly allocated collections, but continues checking the collections that have ever been flagged as potential leaks. This significantly reduces the overhead of the system and allows additional monitoring of the potential leaks.

One implementation of the present invention includes a method of monitoring for potential stores of memory leaks. The method includes tracking the size of a first group of stored items and determining whether that first group of stored items is a potential memory leak source based on change in size of the first group of stored items.

One embodiment for determining whether a particular group of stored items is a source of a memory leak includes receiving a size for that group of stored items and comparing the received size to the current value of a threshold. That group of stored items is reported as being a potential source of a memory leak if the received size satisfies the current value of the threshold and a set of previous values of the threshold have also been satisfied. A group of stored items that has been flagged as a potential memory leak source can subsequently be reclassified as no longer being a source of a memory leak. One implementation for such reclassification is to determine whether a current size of the group of stored items is greater than a current threshold and determine the number of times that the current threshold has been compared to the size of the group since the last time the threshold was changed. If the number of times the size of the group has been compared to the current threshold is greater than the number of times that the size was compared against a previous threshold, then it is concluded that the group is no longer leaking.

By tracking growth patterns in collection instances rather than tracking every object, the burden on the host machine is significantly reduced. This enables the memory leak debugging process to be performed in real time on an application during production operation. By using the tool in production operation, a software developer or the entity responsible for debugging the software will have the opportunity to see the errors that occur when the software is used in its intended environment rather than in an unrealistic debugging environment.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. The present invention can be performed by one or more processors in connection with storage devices, peripherals, and communication interfaces.

These and other objects and advantages of the present invention will appear more clearly from the following description in which the preferred embodiment of the invention has been set forth in conjunction with the drawings.

DETAILED DESCRIPTION

The present invention is used to help locate memory leaks. In one embodiment, the present invention is used to find memory leaks in Java applications; however, in other embodiments, the present invention can be used to find memory leaks in other types of applications created with other types of programming languages or paradigms.

Figures 1, 2:
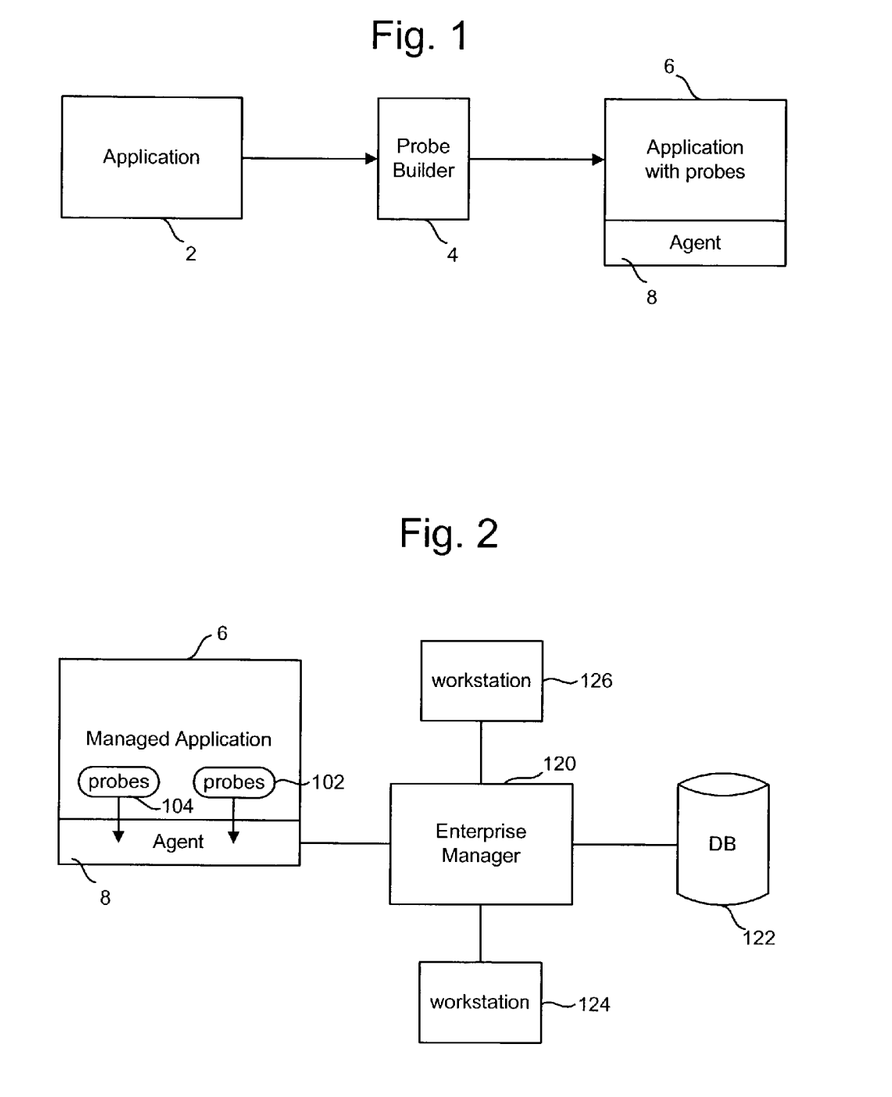
FIG. 1 is a block diagram describing how bytecode for an application is instrumented to add probes that are used to help find memory leaks.
FIG. 2 is a block diagram of a system for monitoring an application. This system represents one example of a system that can implement the present invention.

There are many ways to implement the present invention. One example is to implement the present invention within an application performance management tool. One embodiment of such an application performance management tool monitors performance of an application by having access to the source code and modifying that source code. Sometimes, however, the source code is not available. Another type of tool performs application performance management without requiring access to or modification of the application's source code. Rather, the tool instruments the application's object code (also called bytecode). FIG. 1 depicts a process for modifying an application's bytecode according to one embodiment of an implementation that can be used to perform the present invention. FIG. 1 shows Application 2, Probe Builder 4, Application 6 and Agent 8. Application 6 includes probes, which will be discussed in more detail below. Application 2 is a Java application before the probes are added. In embodiments that use programming language other than Java, Application 2 can be a different type of application.

Probe Builder 4 instruments (e.g. modifies) the bytecode for Application 2 to add probes and additional code to Application 2 in order to create Application 6. The probes measure specific pieces of information about the application without changing the application's business logic. Probe Builder 4 also installs Agent 8 on the same machine as Application 6. Once the probes have been installed in the bytecode, the Java application is referred to as a managed application.

FIG. 2 is a conceptual view of the components of the application performance management tool. In addition to managed Application 6 with probes 102 and 104, FIG. 2 also depicts Enterprise Manager 120, database 122, workstation 124 and workstation 126. Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 2, each of the components are running on different machines. That is, workstation 126 is on a first computing device, workstation 124 is on a second computing device, Enterprise Manager 120 is on a third computing device, and managed Application 6 is running on a fourth computing device. In another embodiment, two or more (or all) of the components are operating on the same computing device. For example, managed application 6 and Agent 8 may be on a first computing device, Enterprise Manager 120 on a second computing device and a workstation on a third computing device. Alternatively, all of the components of Figure two can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the internet, etc. In some embodiments, all or part of the invention is implemented in software that is stored on one or more processor readable storage devices and is used to program one or more processors.

The bytecode is modified by Probe Builder 4 based on a set of rules. Typically, Probe Builder will modify the bytecode for items that are to be tracked. Thus, in one embodiment, the rules identify which items to track. For example, a set of rules could indicate to track all or specific servlets, beans and/or sockets. Additionally, custom probes can be created to measure counts, rates and response time for methods being invoked. A probe is used to enable the measuring of specific pieces of information about an application without changing that application's business logic. Probes track real time performance information, making the information available for review and action.

A metric is a measurement of a specific application activity. Probes can be used to enable the reporting of a set of metrics for a managed application. Examples of metrics collected can include CORBA method timers, remote method indication method timers, thread counters, network bandwidth, JDBC update inquiry timers, servlet timers, Java Server Pages (JSP) timers, system logs, file system input and output bandwidth meters, availability and used memory, enterprise Java bean times, etc.

There are many types of rules that can be used to instruct Probe Builder 4 how to modify the bytecode of an application. One example of a type of rule is the substitute class rule which has the format:

Substitute Class: <original class> <new class>.

The substitute class rule instructs Probe Builder 4 to change the code that allocates an object of the <original class> to code that allocates the object to be of the <new class>, where the <new class> extends (or is a subclass of) the <original class>. A subclass is a first class that inherits the methods and fields of a second class, and is capable of extending or modifying the functionality of the second class. That class whose fields and methods are being inherited is called a superclass. Because a subclass inherits from the superclass and can extend the functionality of the superclass, a subclass is said to extend a superclass. More information about modifying code, including the Substitute Class rule and other examples of rules, can be found in U.S. Pat. No. 6,260,187 "System For Modifying Object Oriented Code" by Lewis K. Cirne, incorporated herein by reference in its entirety. When the present invention is used with programming languages or paradigms other than Java, the allocation of an object or modification of an application's code may be different from what is described herein.

As a managed application runs, probes (e.g. 102 and/or 104) relay data to Agent 8. Agent 8 then collects and summarizes the data, and sends it to Enterprise Manager 120. Data collected by Enterprise Manager 120 can be accessed through one or more workstations. Workstations are used to view performance data and configure Enterprise Manager 120 to perform such tasks as collecting information for later analysis and creating alerts. Enterprise Manager 120 can also be configured to send data to an external data store, such as database 122. Other external data stores can also be used.

The present invention includes adding probes to an application in order to track objects. However, in one embodiment, the present invention does not track every object. There could be millions of objects in an application, and tracking every object could degrade performance. In one embodiment, therefore, the present invention only tracks collection instances. In Java, a collection is an object that represents a group of objects.

The present invention can also be applied more broadly so that it is used to track items other than or in addition to Java collections. Other types of collections can also be tracked. A collection is just one example of a group of stored objects. The present invention can also be used with other types of groups of stored objects. In other embodiments, for example, the present invention can be used to track arrays, link lists, etc.

In non-Java applications, the collection or group of stored items can be thought of as any type of grouping or data type that holds references to a variable number of items and that can manage the variable number of items. An item can be data, code, references, objects, etc.

One embodiment of the present invention tracks the following Java collections:

TABLE 1

| Implementations of java.util.Collection | Implementations of java.util.Map |
| --- | --- |
| java.util.ArrayList | java.util.HashMap |
| java.util.LinkedList | java.util.TreeMap |
| java.util.TreeSet | java.util.WeakHashMap |
| java.util.HashSet | java.util.IdentityHashMap |
| java.util.LinkedHashSet | java.util.Hashtable |
| java.util.Vector | java.util.Properties |
| java.util.Stack | |

Probe Builder 4 uses the Substitute Class rule to substitute the allocation of an object of any of the above classes to an allocation of an object of a new subclass of the original class from the above table. There is a new subclass for each of the above classes. The new subclass includes additional code in the constructor. This additional code will be described below.

In one embodiment, the present invention will instrument, and therefore track, subclasses of those classes identified in Table 1. In some implementations, custom collection implementations or other data structures will not be tracked. In other embodiments, these other custom collection implementations or data structures will be tracked. Additionally, in one embodiment, the system will only track collections that are allocated by the application being instrumented. Therefore, if the application server allocates the collection, the application server itself will need to be instrumented for the system to track the collection. Agent 8 looks for collection instances that appear to be constantly growing in size (i.e. the number of objects stored in the collection grows). These collections are flagged as potential leaks. Agent 8 then reports information about these collections to Enterprise Manager 120. If it is determined that a previously flagged collection appears to no longer be leaking, that change in status will be reported and the system will continue tracking and reporting data for that collection over the lifetime of the application.

An additional feature of the system is a time out period. Before the time out period expires, the system tracks all newly allocated collections. After the time out period expires, the system does not track newly allocated collections; however, it continues to track collections that have ever been flagged as potential leaks. This significantly reduces the overhead of a system. In another embodiment of a time out, if the system does not detect growth of a collection suggesting a leak within the time out period, then the system stops monitoring that collection.

In one embodiment, an operator of the system will be able to set various configuration values in a configuration file. In one implementation, the configuration file includes the following values: enable, log file location, log file append, sensitivity and time out. The enable configuration value determines whether the leak detection system of the present invention is turned on or off. The log file location specifies the location of the log file. The log file append configuration setting specifies whether to replace the existing log file or append to the existing log file on application restart. The sensitivity value determines how sensitive the tool will be to potential leaks. A higher sensitivity value will report more collections as potential leaks. In one embodiment, the sensitivity value is an integer from 1–10. Based on the sensitivity value, the system determines a sensitivity counter value and a growth factor according to Table 2. These values will be discussed in more detail below.

TABLE 2

| Sensitivity Setting | Sensitivity Counter | Growth Factor |
| --- | --- | --- |
| 10 | 3 | 1.05 |
| 9 | 4 | 1.1 |
| 8 | 4 | 1.1 |
| 7 | 5 | 1.15 |
| 6 | 5 | 1.15 |
| 5 | 6 | 1.2 |
| 4 | 7 | 1.4 |
| 3 | 8 | 1.6 |
| 2 | 9 | 1.8 |
| 1 | 10 | 2.0 |

In other embodiments, the system can also include configuration values to determine how often the system should poll the various collections and the maximum number of collections that can be monitored.

Figure 3:
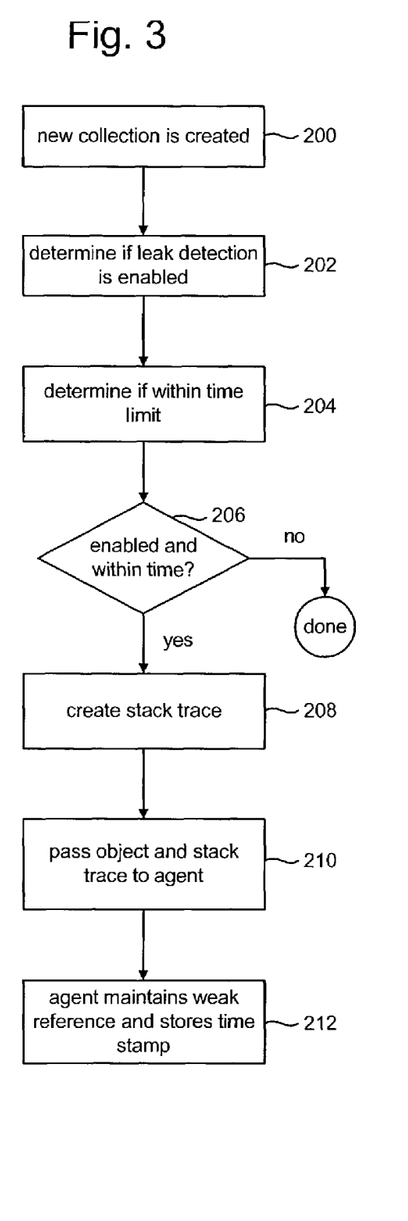
FIG. 3 is a flow chart describing one embodiment of the process performed when a new collection is created.

FIG. 3 is a flow chart describing one embodiment of the process performed when a new collection is created. In step 200, the new collection is created. For example, an object is allocated based on one of the instrumented collection classes. In step 202, the code in the constructor for the collection object will determine if leak detection is enabled by checking the configuration value discussed above. In step 204, the code in the constructor for the collection object will determine if the time out period has expires. As mentioned above, the configuration file includes a setting for a time out. Step 204 includes determining whether that the time out period specified by the time out configuration setting has expired. If leak detection is not enabled or the time out period has expired (step 206), then the process of FIG. 3 is completed. If leak detection is enabled and the time out period has not expired (step 206), then the code in the constructor for the collection object will create a stack trace for the collection object in step 208. In step 210, the code in the constructor for the collection object will pass a reference to the collection object and the stack trace to Agent 8. As described above, this code is in the subclass that was added by Probe Builder 4 using the Substitute Class rule. This added subclass is a subclass to the original class for the collection.

After receiving the reference to the collection object and the stack trace, Agent 8 gets a time stamp for the creation of the object. Agent 8 maintains a weak reference to the object, the time stamp, the stack trace and memory leak data for the object (step 212). The memory leak data will be described below. A weak reference is a feature of Java that does not prevent garbage collection. That is, if the only references to an object are weak references, then the garbage collector will still remove that object. The reason why the leak detection system uses the weak reference is because we don't want the leak detection system to create a leak.

Figure 4:
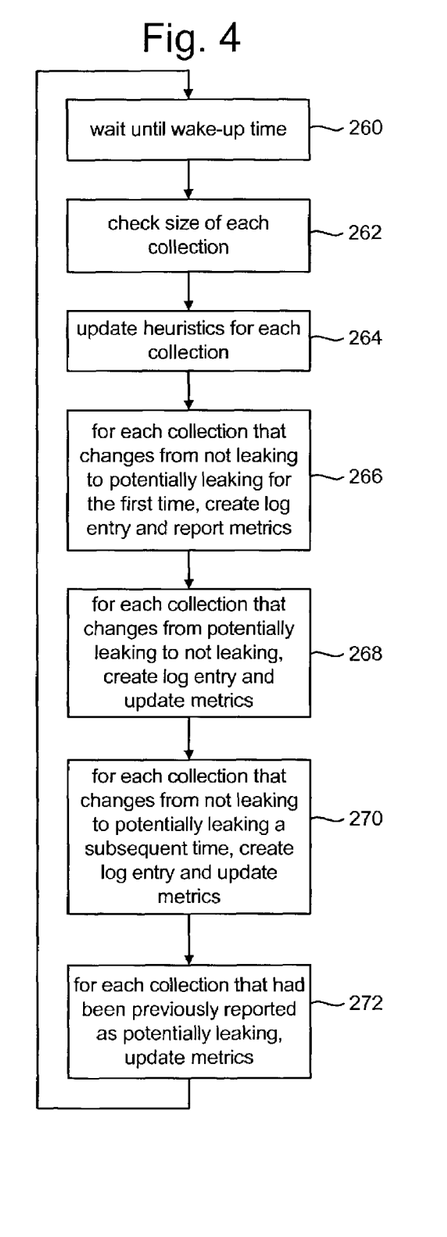
FIG. 4 is a flow chart describing one embodiment of the process for finding potential sources of memory leaks.

FIG. 4 is a flow chart describing one embodiment of the process of finding potential sources of memory leaks. In step 260, the process will wait until the wake up time period is completed. That is, the process of FIG. 4 is repeated periodically. In one embodiment, the process is repeatedly every 7.5 seconds. In another embodiment, the process is repeated every 15 seconds. In one implementation, the periodic rate (e.g. 7.5 seconds, 15 seconds, or other) is determined by setting a configuration variable. At the time for repeating the process, Agent 8 first checks the size of each collection (step 262). Each collection stores its own size. Agent 8 will sweep through all of its weak references and make sure that each object is still present in the heap by performing a simple null check. For each object that is still there, Agent 8 will read the size of that collection. In step 264, Agent 8 will update the heuristics for each collection for which it received a size. The heuristics (to be described in more detail below) determines whether the collection is a potential source of a leak or not. The present invention does not determine with 100% accuracy that any particular collection is a source of a leak. Rather, it identifies collections that are potentially a source of a leak and provides a human operator or another process with identification of that collection and information about that collection. The human or other process can then review all of the information obtained and make a judgment call as to which needs further investigation and/or which collections are in fact a source of a memory leak. By narrowing down to a small set of collections, the debugging process becomes manageable.

For each collection that changes from not being a potential source of a leak to being a potential source of a leak for the first time, Agent 8 creates a log entry and reports metrics to Enterprise Manager 120 in step 266. Enterprise Manager 120 will package the metrics and send them to the various interested workstations for reporting to a user, presentation to a process or storage for another application. The metric sent to the Evaluation Manager include two types of metrics: general metrics and metrics for each suspicious collection. In one embodiment, the general metrics include a total number of tracked collections, the total number of potential leaks, and the allocation rate of collections. In one embodiment, the metrics for suspicious collections includes the class of the collection, the allocation time of the collection, allocation stack trace of the collection, the current size of the collection, and an indication if the collection is currently deemed to be a potential source of a memory leak. Based on this information, the developer of an application can identify whether the collection is a source of memory leak or not. Other metrics can also be reported. In one embodiment, an administrator can customize the set of metrics reported.

The entry in the log file created in step 266 includes the following information: current timestamp when written to the log, an identification (ID) for the collection, the class of the collection, the allocation time of the collection, allocation stack trace for the collection, current size of the collection and ten sample elements in the collection (represented by class name, followed by the toString( ) representation capped at 20 characters). The ID of the collection has the following syntax:

<method>-4 digit hash code>#<unique number>, where <method> is the name of the method when the collection was allocated, <4 digit hash code> is the hash code of the allocation stack trace, and #<unique number> is a number appended to potential leaks with the same method and hash code to ensure unique IDs during the run with the agent.

For each collection that changes from potential leaking to not leaking, a log entry is created and metrics are updated in step 268. The log entry created in step 268 includes the current timestamp when written to the log, the collection ID, and the current size of the collection.

For each collection that changes from not leaking to potential leaking a subsequent time, a log entry is written and metrics are updated in step 270. The log entry created in step 270 includes the current timestamp when written to the log, the collection ID and the current size of the collection.

For each collection that has been previously reported as potentially leaking and is still potentially leaking, the system updates the metrics in step 272.

Figure 5:
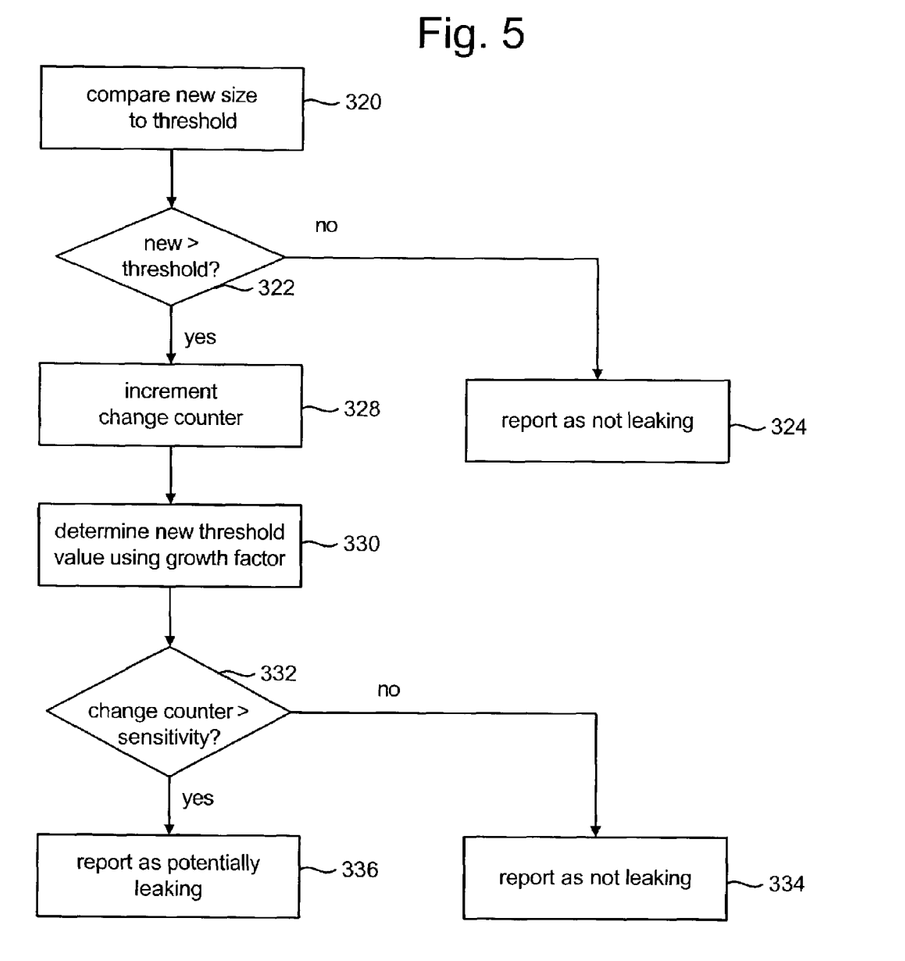
FIG. 5 is a flow chart describing one embodiment of the process of determining whether a particular collection is a potential source of a leak.
Figure 6:
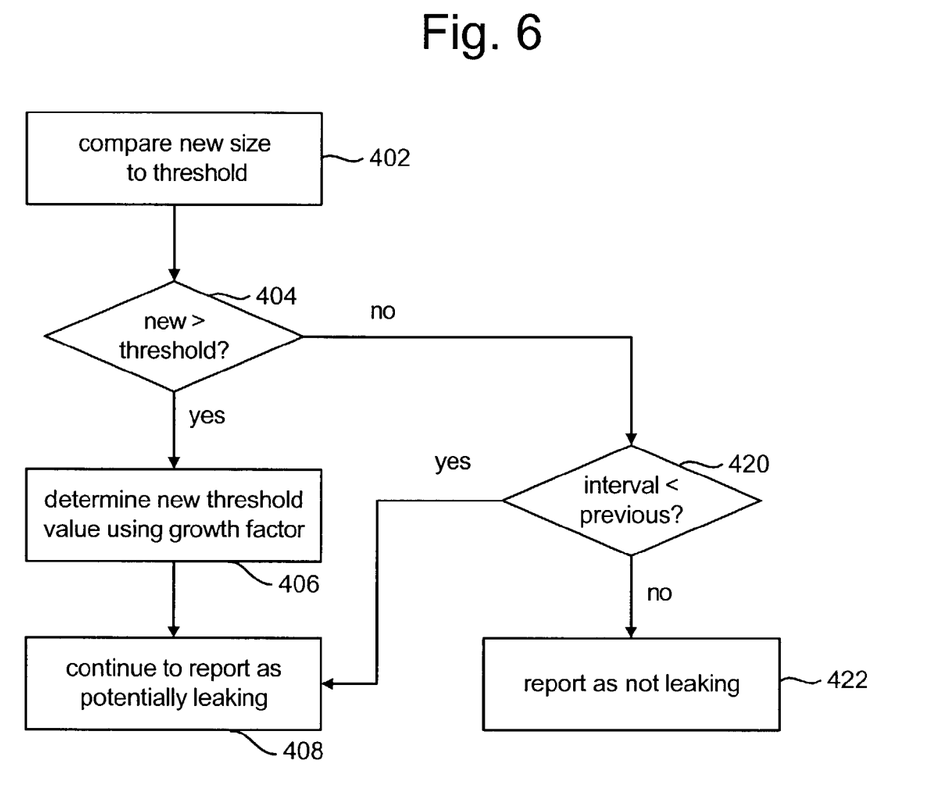
FIG. 6 is a flow chart describing one embodiment of the process of determining whether a collection is no longer a potential source of a leak.

Step 264 of FIG. 4, includes updating the heuristics for each collection. This is the process of determining whether that collection is a potential source of a leak. When updating the heuristics, if the collection is not currently flagged as being a potential source of a leak, then the process of FIG. 5 is performed. If the collection is currently flagged as being a source of a leak, then the process of FIG. 6 is performed. Thus, the process of FIG. 5 is used to determine whether a collection is a potential source of a leak and the process of FIG. 6 is used to determine whether a collection that was previously thought of as being a source of a leak is no longer thought of as being a potential source of a leak.

In step 320 of FIG. 5, the size of the collection is compared to a threshold. Remember, that the size of each collection is read every 7.5 seconds (or other interval). In one embodiment, the first time the size of a collection is read the threshold is set at zero. If the newly read size is not greater than the threshold (step 322), then the collection is reported as not leaking in step 324. If the new size is greater than the threshold, then a change counter is incremented in step 328. The change counter stores how many times the threshold has been changed. A new threshold is then created in step 330. The new threshold is created by multiplying the current value of the size of the collection by a growth factor. The growth factor is selected by the sensitivity setting described above in Table 2. Table 2 shows a growth factor for each particular sensitivity setting. For example, if the sensitivity setting is 7, then the growth factor is 1.15. If the sensitivity setting is 2, then the growth factor is 1.8. Therefore, if the current threshold is zero (e.g. the first time), the collection size is 3 and the growth factor is 1.8, then the new threshold will be 5.4.

In step 322, it is determined whether the change counter is greater than the sensitivity counter. The sensitivity counter is a static number that corresponds to the sensitivity setting described above. For example, Table 2 shows that if the sensitivity setting is 10 then the sensitivity counter is 3, and if the sensitivity setting is 4 then the sensitivity counter is 7. Thus, the first time the first threshold is exceeded (e.g. where the threshold becomes 5.4), the change counter will equal 1, which is less than the sensitivity counter (step 332). Therefore, the collection is reported as not leaking in step 334. If the change counter is greater than the sensitivity counter, then the collection is reported as being a potential source of a leak in step 336. For example, if the sensitivity setting is 9, then the sensitivity setting will be 3. When the change counter is greater than 3, the collection will be reported as a potential source of a leak. In other words, when the size of the collection grows so that more than three thresholds have been exceeded, the collection is reported as being a potential source of a leak.

The lower the sensitivity counter, the more likely the collection will be reported as a potential source of a leak. The greater the sensitivity setting, the lower the sensitivity counter. Thus, a higher sensitivity setting will identify more potential leaks. In general, the heuristics looks to see if the threshold value has been changed X times, where X is the value of the sensitivity counter. Once the threshold value has been changed X times, the collection is considered to be a potential source of a memory leak.

In another embodiment, the heuristics can be performed by monitoring the change in collection size and looking for an upward growth that exceeds a standard deviation, exceeds a particular acceleration rate, etc. Various other properties or relationships can also be used to determine whether the collection has sufficiently increased in size to merit being identified as a potential source of a memory leak.

FIG. 6 is a flow chart describing the process for determining whether a collection that has previously been thought of as a potential source of a leak has changed to not being a potential source of a leak. In step 402, the new size read from the collection is compared to the current threshold. If the new size is greater than the current threshold (step 404), then a new threshold is determined by multiplying the growth factor by the new size in step 406. In step 408, the heuristics continues to report the collection as potentially a source of a memory leak. If the new size was not greater than the threshold (see step 404), then the system determines whether the current interval is less than or greater than the previous interval in step 420. The previous interval is the number of times the threshold was checked prior to the establishment of the current threshold and subsequent to the establishment of the threshold previous in time to the current threshold. In one embodiment, the current interval is the number of times that the collection size has been checked since the largest size of the collection was detected. In another embodiment, the current interval is the number of times that the collection size has been checked since the last time the threshold was changed. If the current interval is less than the previous interval, then Agent 8 continues to report the collection as potentially leaking in step 408. If the current interval is not less than the previous interval, then the collection is thought of as not leaking anymore and is reported as not leaking in step 422.

After a collection's status is changed from leaking to not leaking, heuristics are performed by using the process of FIG. 5. Since the sensitivity counter has already been exceeded, only one threshold need be exceeded for the status of the collection to revert back to leaking. In another embodiment, after a collection's status is changed from leaking to not leaking, the collection will be considered as potentially leaking again when the size of that collection exceeds the largest size previously detected for that collection.

Consider the following example, where the sensitivity setting is 8 and, therefore, the sensitivity counter is 3 and the growth factor is 1.1. Table 3 shows 12 size values read for a particular collection. Each value was read during an iteration of the steps of FIG. 4. For each iteration, Table 3 identifies the threshold value at the start of the iteration and the ending threshold value (the threshold value after step 264).

TABLE 3

| Iteration | Size | Starting Threshold | Ending Threshold | Change Counter |
|---|---|---|---|---|
| 1 | 10 | 0 | 11 | 1 |
| 2 | 9 | 11 | 11 | 1 |
| 3 | 12 | 11 | 13.2 | 2 |
| 4 | 16 | 13.2 | 17.6 | 3 |
| 5 | 15 | 17.6 | 17.6 | 3 |
| 6 | 17 | 17.6 | 17.6 | 3 |
| 7 | 20 | 17.6 | 22 | 4 |
| 8 | 21 | 22 | 22 | 4 |
| 9 | 20 | 22 | 22 | 4 |
| 10 | 19 | 22 | 22 | 4 |

Each time the threshold was exceeded, a new threshold was created by multiplying the current size of the collection by the growth factor of 1.1 (see step 330 of FIG. 5). For example, the threshold was exceeded for the first time during iteration 1; therefore, the threshold value became equal to the current size (10) multiplied by the growth factor of 1.1 to create a new threshold of 11. The change counter became greater than the sensitivity counter of 3 at iteration 7 (see step 332 of FIG. 5). Therefore, during step 266 of iteration 7, the collection was reported as being a potential source of a memory leak. After iteration 7, the process of FIG. 6 was used during step 264 of the process of FIG. 4. In interval 10, the collection was reported as not leaking. That is because the current interval was the same as the previous interval. The current interval was three because iteration 10 was the third time the size of the collection was checked while at the threshold of 22. The previous interval was 3 because the size of the collection was checked three times while at the threshold of 17.6. Because the current interval was not less than the previous interval (see step 420 of FIG. 6), then the collection is reported as not leaking in step 422.

Once the user receives an alert of the potential source of a leak, the user can decide whether that collection is in fact a source of a leak based on the alert, the user's knowledge of the application program, and/or the log file. In addition to providing a graphical display via the workstation, the Enterprise Manager can send alerts to the user via e-mail, a pager, cell phone, etc.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of monitoring for potential sources of memory leaks, comprising the steps of:
   tracking size of a first group of stored items; and
   determining whether said first group of stored items is a potential memory leak source based on a plurality of detected size changes of said first group of stored items and two or more thresholds associated with the plurality of detected size changes.

2. A method according to claim 1, wherein:
   said first group of stored items is a Java collection.

3. A method according to claim 2, wherein:
said step of determining is based on a growth pattern of said Java collection.

4. A method according to claim 2, wherein said step of determining comprises the steps of:
comparing a recently received size of said first group of stored items to a current value of a threshold; and
reporting that said first group of stored items is said potential memory leak source if said received size satisfies said current value of said threshold and a set of previous values of said threshold have also been satisfied.

5. A method according to claim 4, wherein a first value of said previous values of said threshold was determined by multiplying a growth factor by a previous size.

6. A method according to claim 1, further comprising the step of:
determining that said first group of stored items is no longer the potential memory leak source.

7. A method according to claim 6, wherein said step of determining that said first group of stored items is no longer the potential memory leak source comprises the steps of:
determining whether a current size of said first group of stored items is greater than a current threshold;
determining a number of times said current threshold has been compared to size of said first group of stored items; and
comparing said number of times said current threshold has been compared to a number of times a previous threshold has been compared, said first group of stored items is no longer the potential memory leak source if said number of times said current threshold has been compared is greater than said number of times a previous threshold has been compared.

8. A method according to claim 1, further comprising the steps of:
(a) reporting that said first group of stored items is the potential memory leak source;
(b) reporting that said first group of stored items is no longer the potential memory leak source; and
(c) reporting that said first group of stored items is the potential memory leak source, step (b) is performed after step (a) and step (c) is performed after step (b).

9. A method according to claim 1, wherein:
said step of tracking tracks size for multiple groups of stored items;
said step of determining is performed for said multiple groups of stored items;
if a new group is created during a predetermined period, said step of tracking will track said new group and said step of determining will be performed for said new group during said predetermined period and after said predetermined period; and
if a new group is created after a predetermined period, said step of tracking will not track said new group and said step of determining will not be performed for said new group.

10. A method according to claim 1, further comprising the steps of:
determining that said first group has been created;
determining whether leak detection is enabled in response to said first group being created; and
maintaining a weak reference to said first group.

11. A method according to claim 1, wherein:
said step of tracking tracks size for multiple groups of stored items; and
said step of tracking includes maintaining weak references to said multiple groups of stored items.

12. A method according to claim 1, wherein:
said first group of stored items are Java collections used by an application; and
said steps of tracking and determining are performed using code that is added to said application using bytecode instrumentation.

13. A method according to claim 1, further comprising the steps of:
receiving original bytecode for an application, said first group of stored items is a Java collections used by said application; and
modifying said original bytecode including adding new bytecode to said original bytecode, said new bytecode enables said steps of tracking and determining.

14. A method according to claim 13, wherein:
said step of determining comprises the steps of comparing a recently received size of said first group of stored items to a current value of a threshold and reporting that of said first group of stored items is said potential memory leak source if said received size satisfies said current value of said threshold and a set of previous values of said threshold have also been satisfied.

15. A method according to claim 1, wherein:
said step of determining includes reporting about said first group of stored items.

16. A method according to claim 1, wherein:
said steps of tracking and determining are performed by a computing device.

17. A method according to claim 1, wherein:
said steps of tracking and determining are automatically performed by a computing device.

18. A method according to claim 1, wherein:
said first group of stored items are used by an application; and
said steps of tracking and determining are performed during production operation of said application.

19. A method according to claim 1, wherein:
said first group of stored items is a Java collection;
said step of determining comprises the steps of comparing a recently received size of said first group of stored items to a current value of a threshold and reporting that of said first group of stored items is said potential memory leak source if said received size satisfies said current value of said threshold and a set of previous values of said threshold have also been satisfied;
a first value of said previous values of said threshold was determined by multiplying a growth factor by a previous size;
said step of tracking includes maintaining a weak reference to said first group of stored items; and
said method further includes the step of determining that said first group of stored items is no longer the potential memory leak source.

20. A method of monitoring for potential sources of memory leaks, comprising:
tracking size of a first group of stored items, said first group of stored items is a Java collection; and
determining whether said first group of stored items is a potential memory leak source based on a plurality of detected size changes of said first group of stored items, wherein said of determine comprises the steps of:
comparing a recently received size of said first group of stored items to a current value of a threshold; and
reporting that said first group of stored items is said potential memory leak source if said received size satisfies said current value of said threshold and a set of previous values of said threshold have also been satisfied, wherein a size of said set of previous values of said threshold is determined by a changeable sensitivity setting.

21. One or more processor readable storage devices having processor readable code embodied on said processor readable storage devices, said processor readable code for programming one or more processors to perform a method comprising the steps of:
tracking size of a first group of stored items; and
determining whether said first group of stored items is a potential memory leak source based on change in size of said first group of stored items and a plurality of satisfied size thresholds.

22. One or more processor readable storage devices according to claim 21, wherein:
said first group of stored items is a Java collection.

23. One or more processor readable storage devices according to claim 22, wherein said method further comprises the step of:
(a) reporting that said first group of stored items is the potential memory leak source;
(b) reporting that said first group of stored items is no longer the potential memory leak source; and
(c) reporting that said first group of stored items is the potential memory leak source, step (b) is performed after step (a) and step (c) is performed after step (b).

24. One or more processor readable storage devices according to claim 23, wherein:
said step of tracking tracks size for multiple groups of stored items;
said step of determining is performed for said multiple groups of stored items;
if a new group is created during a predetermined period, said step of tracking will track said new group and said step of determining will be performed for said new group during said predetermined period and after said predetermined period; and
if a new group is created after a predetermined period, said step of tracking will not track said new group and said step of determining will not be performed for said new group.

25. One or more processor readable storage devices according to claim 21, wherein said step of determining comprises the steps of:
comparing a recently received size of said first group of stored items to a current value of a threshold; and
reporting that said first group of stored items is said potential memory leak source if said received size satisfies said current value of said threshold and if a set of previous values of said threshold have also been satisfied.

26. One or more processor readable storage devices according to claim 25, wherein a first value of said previous values of said threshold was determined by multiplying a growth factor by a previous size.

27. One or more processor readable storage devices according to claim 21, wherein said method further comprises the step of:
determining that said first group of stored items is no longer the potential memory leak source.

28. One or more processor readable storage devices according to claim 27, wherein said step of determining that said first group of stored items is no longer the potential memory leak source comprises the steps of:
determining whether a current size of said first group of stored items is greater than a current threshold;
determining a number of times said current threshold has been compared to size of said first group of stored items; and
comparing said number of times said current threshold has been compared to a number of times a previous threshold has been compared, said first group of stored items is no longer the potential memory leak source if said number of times said current threshold has been compared is greater than said number of times a previous threshold has been compared.

29. One or more processor readable storage devices according to claim 21, wherein:
said step of tracking tracks size for multiple groups of stored items; and
said step of tracking includes maintaining weak references to said multiple groups of stored items.

30. One or more processor readable storage devices according to claim 21, wherein:
said first group of stored items are used by an application; and
said steps of tracking and determining are performed during production operation of said application.

31. One or more processor readable storage devices according to claim 30, wherein:
said first group of stored items is a Java collection.

32. One or more processor readable storage devices according to claim 31, wherein said step of determining comprises the steps of:
comparing a recently received size of said first group of stored items to a current value of a threshold; and
reporting that said first group of stored items is said potential memory leak source if said received size satisfies said current value of said threshold and a set of previous values of said threshold have also been satisfied.

33. An apparatus, comprising:
one or more storage devices; and
one or more processors in communication with said one or more storage devices, said one or more processors track size of a first group of stored items and determine whether said first group of stored items is a potential memory leak source based on a plurality of detected size changes of said first group of stored items and two or more thresholds associated with the plurality of detected size changes.

34. An apparatus according to claim 33, wherein:
said first group of stored items is a Java collection of objects.

35. An apparatus according to claim 34, wherein said one or more processors compare a recently received size of said first group of stored items to a current value of a threshold and report that said first group of stored items is said potential memory leak source if said received size satisfies said current value of said threshold and a set of previous values of said threshold have also been satisfied.

36. An apparatus according to claim 34, wherein said one or more processors determine that said first group of stored items is no longer the potential memory leak source.

37. An apparatus according to claim 34, wherein said one or more processor track size for multiple groups of stored items and said one or more processor include maintaining weak references to said multiple groups of stored items.

38. An apparatus according to claim 34, wherein said first group of stored items are used by an application and said one or more processors track and determine during production operation of said application.

39. A method of monitoring for potential sources of memory leaks, comprising the steps of:
automatically tracking size of a first group of stored items; and
automatically determining whether said size of said first group of stored items grows in a manner that suggests a memory leak based on two or more thresholds, wherein said steps of automatically tracking and automatically determining are performed by bytecode inserted into an application.

40. A method according to claim 39, wherein:
said first group of stored items is a Java collection.

41. A method according to claim 40, further comprising the step of:
determining in real-time that said first group of stored items is not said potential source of said memory leak.

42. A method according to claim 40, wherein:
said first group of stored items are used by an application; and
said steps of tracking and determining are performed during production operation of said application.

43. One or more processor readable storage devices having processor readable code embodied on said processor readable storage devices, said processor readable code for programming one or more processors to perform a method comprising the steps of:
tracking size of a first group of stored items; and
determining whether said size of said first group of stored items has a growth pattern that suggests a memory leak based on two or more thresholds, wherein said steps of tracking and determining are performed by bytecode inserted into an application.

44. One or more processor readable storage devices according to claim 43, wherein:
said first group of stored items is a Java collection.

45. One or more processor readable storage devices according to claim 44, wherein said method further comprises the step of:
determining in real-time that said first group of stored items is not a potential source of a memory leak.

46. One or more processor readable storage devices according to claim 45, wherein:
said first group of stored items are used by an application; and
said steps of tracking and determining are performed during production operation of said application.

47. A method of monitoring for potential sources of memory leaks, comprising the steps of:
receiving a size of a group of stored items;
comparing said received size to a current value of a threshold; and
reporting that said group of stored items is a potential source of a memory leak if said received size satisfies said current value of said threshold and if a set of previous values of said threshold have also been satisfied based on a comparison of each previous threshold value to a corresponding previous size of the group of stored items.

48. A method according to claim 47, wherein:
said group of stored items is a Java collection.

49. A method according to claim 47, wherein:
a size of said set of previous values of said threshold are determined by a changeable sensitivity setting.

50. A method according to claim 47, further comprising the step of:
determining in real time that said first group of stored items is no longer the potential memory leak source.

51. A method according to claim 50, wherein said step of determining in real time that said first group of stored items is no longer the potential source of said memory leak comprises the steps of:
determining whether a current size of said first group of stored items is greater than a current threshold;
determining a number of times said current threshold has been compared to size of said first group of stored items since; and
comparing said number of times said current threshold has been compared to a number of times a previous threshold has been compared, said first group of stored items is no longer the potential source of said memory leak if said number of times said current threshold has been compared is greater than said number of times a previous threshold has been compared.

52. A method according to claim 51, wherein:
said group of stored items is a Java collection of objects.

53. A method according to claim 47, further comprising the steps of:
(a) reporting that said first group of stored items is the potential source of the memory leak;
(b) reporting that said first group of stored items is no longer the potential source of the memory leak; and
(c) reporting that said first group of stored items is the potential memory leak source of the memory leak, step (b) is performed after step (a) and step (c) is performed after step (b).

54. One or more processor readable storage devices having processor readable code embodied on said processor readable storage devices, said processor readable code for programming one or more processors to perform a method comprising the steps of:
receiving a size of a group of stored items;
comparing said received size to a current value of a threshold; and
determining that said group of stored items is a potential source of a memory leak if said received size satisfies said current value of said threshold and a set of previous values of said threshold have also been satisfied based on a comparison of each previous threshold value to a previous size of the group.

55. One or more processor readable storage devices according to claim 54, wherein:
said group of stored items is a Java collection of objects.

56. One or more processor readable storage devices according to claim 55, further comprising the step of:
determining that said first group of stored items is not said potential source of said memory leak.

57. One or more processor readable storage devices according to claim 56, wherein said step of determining that said first group of stored items is no longer the potential source of said memory leak comprises the steps of:
determining whether a current size of said first group of stored items is greater than a current threshold;
determining a number of times said current threshold has been compared to size of said first group of stored items since; and
comparing said number of times said current threshold has been compared to a number of times a previous threshold has been compared, said first group of stored items is no longer the potential source of said memory leak if said number of times said current threshold has been compared is greater than said number of times a previous threshold has been compared.

58. One or more processor readable storage devices according to claim 57, wherein:
said group of stored items is a Java collection of objects.

59. One or more processor readable storage devices according to claim 54, wherein:
a size of said set or previous values of said threshold are determined by a changeable sensitivity setting.

60. An apparatus, comprising:
one or more storage devices; and
one or more processors in communication with said one or more storage devices, said one or more processors receive a size of an instance of a collection, compare said received size to a current value of a threshold, and determine that said instance of said collection is a potential source of a memory leak if said received size satisfies said current value of said threshold and a set of previous values of said threshold have also been satisfied based on a comparison of each previous threshold value to a previous size of the group.

61. An apparatus, comprising:
one or more storage devices; and
one or more processors in communication with said one or more storage devices, said one or more processors track size of a first instance of a collection, and determine whether said size of said first instance of said collection grows in a manner that suggests a memory leak based on two or more thresholds, wherein said steps of tracking and determining are performed by bytecode inserted into an application.

* * * * *